(12) United States Patent
Du et al.

(10) Patent No.: US 8,935,009 B2
(45) Date of Patent: Jan. 13, 2015

(54) METHOD AND APPARATUS FOR CONTROLLING MULTIPLE VARIABLE DISPLACEMENT HYDRAULIC PUMPS

(75) Inventors: Hongliu Du, Naperville, IL (US); Patrick W. Sullivan, Tinley Park, IL (US)

(73) Assignee: Caterpillar Inc., Peoria, IL (US)

( * ) Notice: Subject to any disclaimer, the term of this patent is extended or adjusted under 35 U.S.C. 154(b) by 379 days.

(21) Appl. No.: 13/102,864

(22) Filed: May 6, 2011

(65) Prior Publication Data
US 2012/0283882 A1 Nov. 8, 2012

(51) Int. Cl.
G05D 7/00 (2006.01)
F04B 49/00 (2006.01)
G05D 16/20 (2006.01)
F04B 1/29 (2006.01)
F04B 23/06 (2006.01)
F04B 49/03 (2006.01)

(52) U.S. Cl.
CPC ............. *G05D 16/2073* (2013.01); *F04B 1/29* (2013.01); *F04B 23/06* (2013.01); *F04B 49/03* (2013.01)
USPC .............. 700/282; 417/46; 417/213; 417/216

(58) Field of Classification Search
None
See application file for complete search history.

(56) References Cited

U.S. PATENT DOCUMENTS

| | | | |
|---|---|---|---|
| 3,941,514 A * | 3/1976 | Louis et al. | 417/216 |
| RE30,226 E * | 3/1980 | Louis et al. | 417/216 |
| 4,436,487 A * | 3/1984 | Purvis et al. | 417/46 |
| 4,809,504 A * | 3/1989 | Izumi et al. | 60/430 |
| 5,659,485 A | 8/1997 | Lee | |
| 6,109,030 A * | 8/2000 | Geringer | 60/430 |
| 6,374,722 B1 | 4/2002 | Du et al. | |
| 6,375,433 B1 | 4/2002 | Du et al. | |
| 6,468,046 B1 | 10/2002 | Du et al. | |
| 6,623,247 B2 | 9/2003 | Du | |
| 2004/0115065 A1 | 6/2004 | Du et al. | |
| 2004/0261407 A1 | 12/2004 | Du | |
| 2005/0022589 A1 | 2/2005 | Du | |
| 2005/0283299 A1 | 12/2005 | Du et al. | |
| 2006/0095163 A1 | 5/2006 | Wear et al. | |
| 2006/0162439 A1 | 7/2006 | Du | |
| 2007/0119161 A1 | 5/2007 | Du et al. | |
| 2009/0005914 A1 | 1/2009 | DeMarco et al. | |

FOREIGN PATENT DOCUMENTS

JP 1988112137 5/1988

* cited by examiner

*Primary Examiner* — Sean Shechtman
(74) *Attorney, Agent, or Firm* — Ledig, Voit & Mayer, Ltd.

(57) ABSTRACT

A method and apparatus for controlling discharge pressure and pump displacement of a plurality of variable displacement hydraulic pumps having connected discharge ports is provided. Each pump includes a swashplate and a control valve for controlling an angle of inclination of the swashplate. A desired first pump displacement control law is determined for a first pump and determined a desired second pump discharge pressure control law for a second pump. The first control law is used to determine a first intermediate control variable. The second control law is used to determine a second intermediate control variable. The control of the first and second pumps are combined using the first and second intermediate control variables. A desired first control valve setting for the control valve of the first pump is determined using the combined first and second intermediate control variables and the first control law. A desired second control valve setting for the control valve of the second pump is determined using the combined first and second intermediate control variables and the second control law.

20 Claims, 5 Drawing Sheets

METHOD AND APPARATUS FOR CONTROLLING MULTIPLE VARIABLE DISPLACEMENT HYDRAULIC PUMPS

TECHNICAL FIELD

This patent disclosure relates generally to variable displacement hydraulic pumps and, more particularly to methods and apparatuses for controlling multiple variable displacement hydraulic pumps.

BACKGROUND

Variable displacement hydraulic pumps are used in a variety of applications. For example, hydraulic construction machines, earthworking machines, and the like, often use variable displacement hydraulic pumps to provide the pressurized hydraulic fluid flow required to perform desired work functions. Operation of the pumps can be subject to variations in pressure and flow output caused by variations in load requirements. It has long been desired to maintain the pressure output of the pumps in a consistent manner so that operation of the hydraulic systems is well behaved and predictable. Therefore, attempts have been made to monitor the pressure output of a pump, and control pump operation accordingly to compensate for changes in loading. The pressure output of a variable displacement hydraulic pump is typically adjusted by changing the angle of a swashplate of the pump which changes the displacement of the pump.

As the power requirements of the machines in which variable displacement hydraulic pumps increases, so does the hydraulic fluid power requirements. However, due to restrictions in the structure of variable displacement hydraulic pumps as well as the properties of the hydraulic fluid, the size of the pumps that can be used practically is limited. Thus, in applications where a large flow of pressurized hydraulic fluid is desired, two variable displacement pumps can be arranged with their discharge ports connected together. Since the pump discharge ports are connected, the two pumps are hydraulically interacting with each other. In particular, the discharge pressures of the two pumps are always the same. Consequently, with a given pump load flow, any change in either swashplate angle will affect the discharge pressure. If the swashplates of the two pumps are controlled independently by respective control valves with feedback of the swashplate positions and the pump discharge pressure, several closed loops are formed making the design of the control system significantly more complicated than for a single pump.

One issue with controlling two pumps with a connected discharge port can occur in circumstances where the parameters of the two pumps are different either due to manufacturing and assembly tolerances but the two controllers are identical or where the parameters of the two controllers are different. Under such circumstances, the swashplate angles for the two pumps will be different under steady state conditions. As a result, a positive feedback process in the control systems can lead to the positions of the swashplates being moved to opposite extremes. In particular, a pressure increase in the system can cause the controller of the first pump to move the pump swashplate into a position that decreases the displacement of the pump (i.e., de-stroke the swashplate). This decreases the pressure in the system. However, if the pressure decreases too much, the controller for the second pump may attempt to increase the pressure in the system by directing the swashplate of the second pump into a position that increases the displacement of the second pump (i.e., up-stroke the swashplate). If the pressure increases too far, the controller for the first pump will attempt to compensate by decreasing the pressure by again decreasing the displacement of the first pump. Again, if the reduction goes too far, the second controller will yet again increase the displacement of the second pump to increase the pressure in the system. This loop can continue until the swashplate of one of the pumps hits its extreme position, i.e. fully up-stroked or full de-stroked. When the swashplate is in such a position, the performance and stability of the hydraulic system can be significantly degraded.

Another issue with controlling two pumps with a connected discharge port can arise when trying to optimize the operating efficiency of the two pumps. With a given set of other working conditions, the efficiency of the two pumps depends on their displacement. Thus, optimizing the operating efficiency of the hydraulic system for a particular discharge pressure, involves selecting the most favorable combination of the displacements of the two pumps. However, since the discharge ports of the two pumps are connected, any change in the displacement of one pump will necessarily affect the other one. As a result, a system that controls the two pumps with the same command cannot optimize the efficiency of the two pumps.

SUMMARY

The disclosure describes, in one aspect a method for controlling discharge pressure and pump displacement of a plurality of variable displacement hydraulic pumps having connected discharge ports with each pump including a swashplate and a control valve for controlling an angle of inclination of the swashplate. The method including the steps of determining a desired first pump displacement control law for a first pump and determining a desired second pump discharge pressure control law for a second pump. The first control law is used to determine a first intermediate control variable. The second control law is used to determine a second intermediate control variable. The control of the first and second pumps are combined using the first and second intermediate control variables. A desired first control valve setting for the control valve of the first pump is determined using the combined first and second intermediate control variables and the first control law. A desired second control valve setting for the control valve of the second pump is determined using the combined first and second intermediate control variables and the second control law.

In another aspect, the disclosure describe an apparatus for controlling discharge pressure and pump displacement of a plurality of variable displacement hydraulic pumps having connected discharge ports. The apparatus includes a first swashplate pivotably supported with respect to a first pump and a second swashplate pivotably supported with respect to a second pump. A first control valve controls an angle of inclination of the first swashplate and a second control valve controls an angle of inclination of the second swashplate. At least one controller is in communication with the first and second control valves. The controller is configured with a desired first pump displacement control law for the first pump and a desired second pump discharge pressure control law for a second pump. The controller is also configured to use the first control law to determine a first intermediate control variable and to use the second control law to determine a second intermediate control variable. The controller combines the control of the first and second pumps using the first and second intermediate control variables and determining a desired first control valve setting for the control valve of the first pump using the combined first and second intermediate control variables and the first control law and determines a desired second control valve setting for the control valve of the second pump using the combined first and second intermediate control variables and the second control law.

According to another aspect, the disclosure describes a hydraulic system for providing hydraulic power to a load. The system includes a first variable displacement hydraulic pump including a first swashplate pivotably supported with respect to the first pump and a first control valve for controlling an angle of inclination of the first swashplate. The first pump has a first discharge port out of which pressurized hydraulic fluid is discharged from the first pump. The system includes a second variable displacement hydraulic pump including a second swashplate pivotably supported with respect to the second pump and a second control valve for controlling an angle of inclination of the second swashplate. The second pump has a second discharge port out of which pressurized hydraulic fluid is discharged from the second pump and wherein the first and second discharge ports are connected. At least one controller is in communication with the first and second control valves. The controller is configured with a first desired pump displacement control law for the first pump and a second desired pump discharge pressure control law for a second pump and configured to use the first control law to determine a first intermediate control variable and to use the second control law to determine a second intermediate control variable. The controller combines the control of the first and second pumps using the first and second intermediate control variables. The controller determines a desired control valve setting for the control valve of the first pump using the combined first and second intermediate control variables and the first control law and determines a desired control valve setting for the control valve of the second pump using the combined first and second intermediate control variables and the second control law.

DETAILED DESCRIPTION

Figure 1:
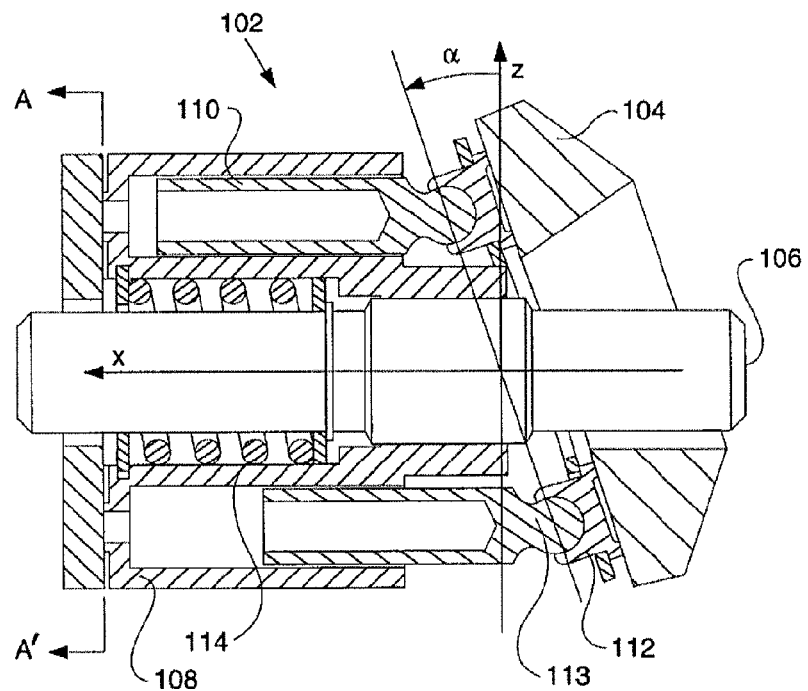
FIG. 1 is a diagrammatic side profile cutaway view of a variable displacement hydraulic pump suitable for use with the apparatuses and methods according to the present disclosure.
Figure 2:
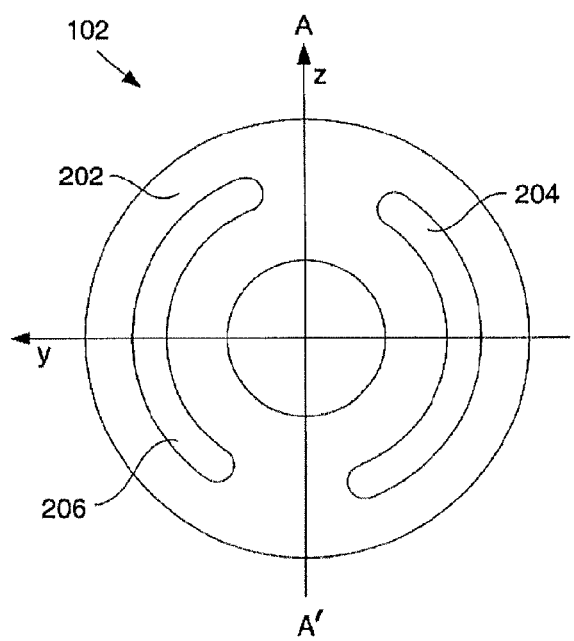
FIG. 2 is a diagrammatic end view of the pump of FIG. 1.

This disclosure relates to an apparatus and method for controlling a system of two or more variable displacement hydraulic pumps, hereinafter pumps, that have connected discharge ports for delivering pressurized hydraulic fluid to a load. With particular reference to FIGS. 1 and 2, an individual exemplary variable displacement hydraulic pump 102 (hereinafter referred to as first pump 102) of the plurality of pumps is shown. The two or more pumps that can be controlled by the apparatus and method of the disclosure can be similarly or differently configured. Additionally, while an exemplary embodiment involving a pair of variable displacement hydraulic pumps is illustrated and described, the apparatus and method of the disclosure is also applicable to systems having more pumps having connected discharge ports as described further below.

The first pump 102 illustrated in FIG. 1 is an axial piston swashplate hydraulic pump having a plurality of pistons 110 located in a circular array within a cylinder block 108. The pistons 110 can be spaced at equal intervals about a shaft 106 that is located at a longitudinal center axis of the block 108. In this instance, the cylinder block 108 is compressed against a valve plate 202 by a cylinder block spring 114. As shown in FIG. 2, the valve plate includes an intake port 204 and a discharge port 206. In the illustrated embodiment, each piston 110 is connected to a slipper 112 by a ball and socket joint 113. Each slipper 112 is maintained in contact with a swashplate 104. The swashplate 104 is pivotably mounted to the pump 102 such that the angle of inclination a is controllably adjustable so as to allow for adjustment of the displacement of the pump.

When the cylinder block 108 is rotated relative to the valve plate 202, each piston 110 periodically passes over each of the intake and discharge ports 204, 206 of the valve plate 202. The angle of inclination a of the swashplate 104 causes the pistons 110 to undergo an oscillatory displacement in and out of the cylinder block 108, thus drawing hydraulic fluid into the intake port 204, which is a low pressure port, and discharging hydraulic fluid out of the discharge port 206, which is a high pressure port. The first pump 102 provides pressurized hydraulic fluid to the discharge port 206 of the valve plate 202 by means of a pump output port 314.

Figure 3:
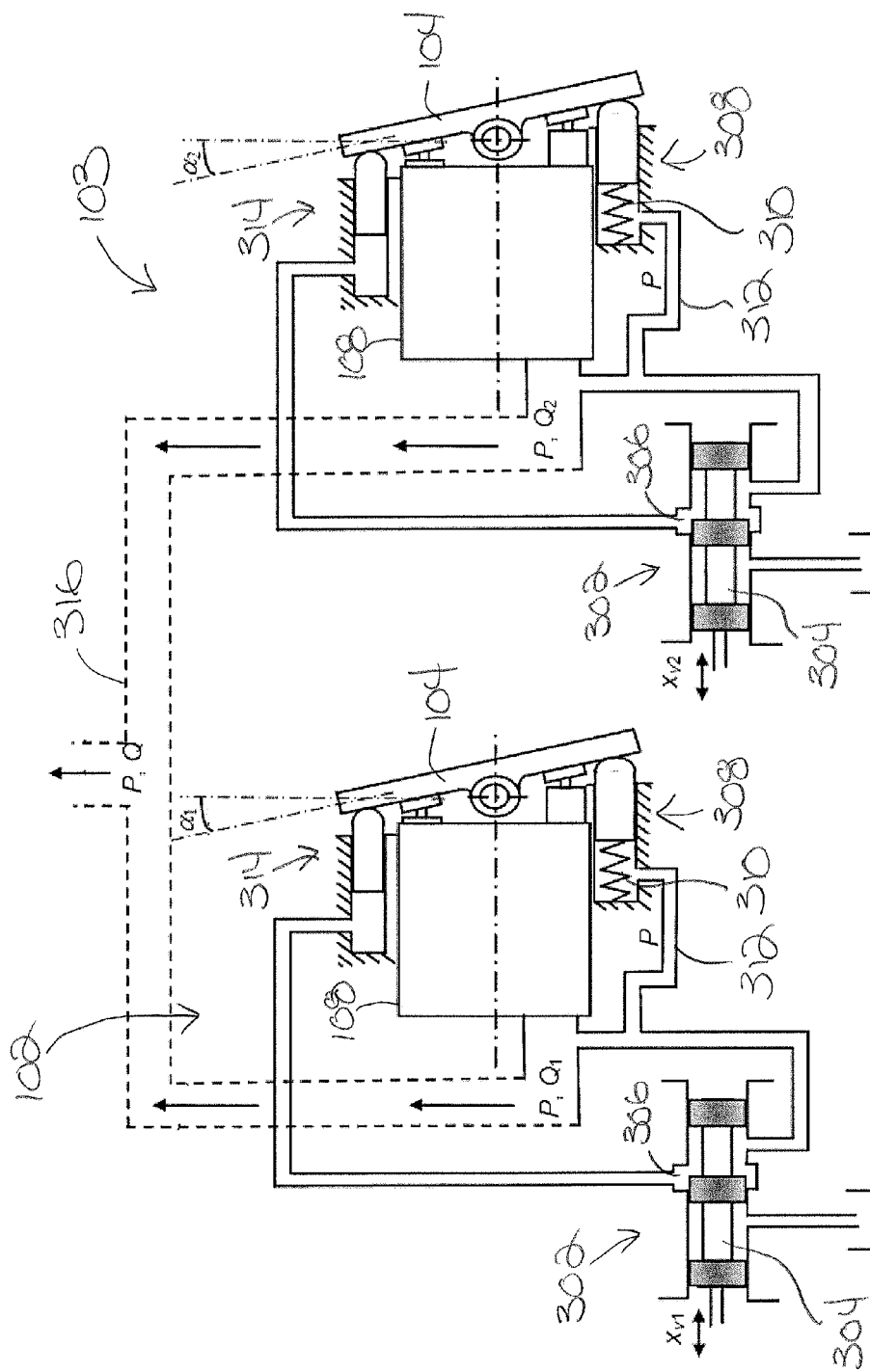
FIG. 3 is a diagrammatic illustration of a pair of pumps each including a respective servo valve.

A system for delivering pressurized hydraulic fluid including first and second pumps 102, 103 that have discharge ports connected via line 316 is shown in FIG. 3. In the illustrated embodiment, the first and second pumps 102, 103 are similarly configured and arranged in tandem (i.e., in series), however, side-by-side (i.e., parallel) or other arrangements can also be used. In the illustrated system, the angle of inclination a of the swashplate 104 of each of the first and second pumps 102, 103 inclines about a swashplate pivot point with the inclination being controlled by a respective control valve 302. In this instance, each control valve 302 is a three-way single-stage servo valve. The illustrated control valves 302 each include a valve spool 304 that is controllably moved within the control valve 302 to control hydraulic fluid flow at an output port 306 of the respective control valve 302. The control valve 302 can be an electro-hydraulic valve, and thus controllable by an electrical signal being delivered to the valve.

With each of the first and second pumps 102, 103, a discharge pressure feedback servo 308, in cooperation with a servo spring 310, operates to increase the angle of inclination $\alpha_1$, $\alpha_2$ of the respective swashplate 104, thus increasing the stroke of the pump 102. In the illustrated embodiment, the discharge pressure of each first and second pumps 102, 103 is fed directly back to the pressure feedback servo 308 via a respective feedback line 312. Additionally, with each pump, a control servo 314, receives pressurized fluid from the output port 306 of the control valve 302, and responsively operates to decrease the angle of inclination $\alpha_1$, $\alpha_2$ of the respective swashplate 104, thus decreasing the stroke of the pump 102, 103. In a known manner, the control servo 314 can be larger in size and capacity than the discharge pressure feedback servo 308 under some circumstances.

Figure 4:
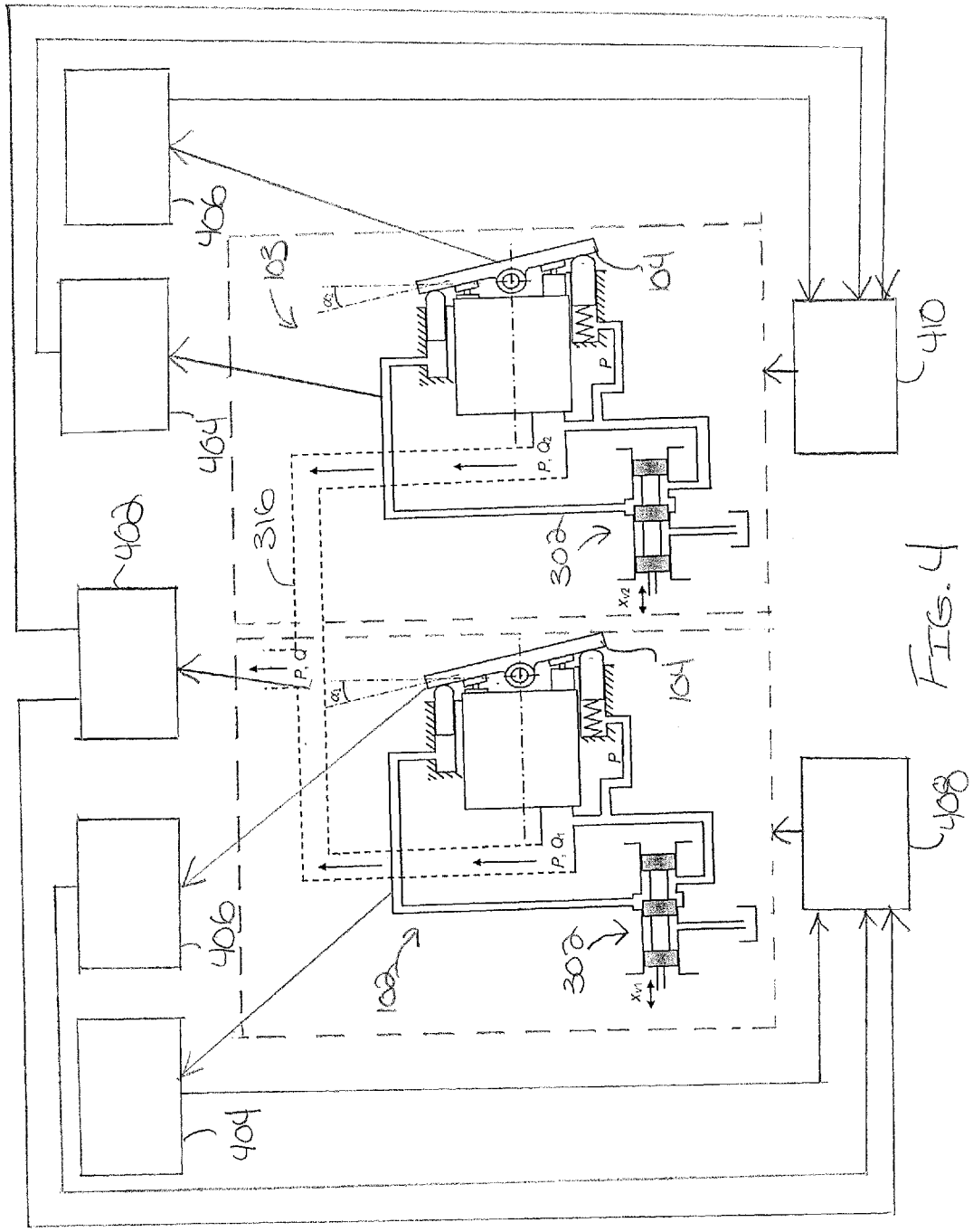
FIG. 4 is a block diagram of a pair of pumps with respective control systems according to an aspect of the disclosure.

For determining various operating parameters of the first and second pumps 102, 103, assorted sensors may be provided. For example, a pump discharge pressure sensor 402 can be provided that is adapted to sense the output pressure of the hydraulic fluid from the first and second pumps 102, 103 as shown in FIG. 4. The pump output pressure sensor 402 can be located at any position suitable for sensing the pressure of the fluid from the first and second pumps 102, 103, such as at the discharge port 206 of one of the pumps, in the line 316 connecting the two discharge ports or at a point along the hydraulic fluid line from the pumps 102, 103 to the hydraulic system being supplied with pressurized fluid. Additionally, a control pressure sensor 404 can be provided for each for the first and second pumps 102, 103 that is adapted to sense the pressure of the hydraulic fluid being provided to the control servo 314 by the respective control valve 302. The control pressure sensor 404 may be arranged in any suitable location such as at the control servo 314 or the control valve output port 306 of the respective pump. A swashplate angle sensor 406 for sensing the angle of inclination α of the swashplate 104 can also be provided for each pump. Each swashplate angle sensor 406, for example, may be a resolver mounted to the swashplate 104, a strain gauge attached to the swashplate 104, or some other type of sensor well known in the art. Depending upon the particular control strategies employed, pump parasitic torque load and/or the pump mechanical (torque) efficiency map sensors can be provided. Moreover, control pressure sensors and swashplate angle sensors may not be have to be provided for each pump depending on the particular control strategies being used.

For controlling operation of the first and second pumps 102, 103, each can have a respective controller 408, 410 as shown in FIG. 4. The controllers 408, 410 can be operably connected to the respective pump 102 and each can be configured to receive the sensed information from the various pump operation sensors including, in this case, the pump discharge pressure sensor 402, the respective swashplate angle sensors 406, and respective control pressure sensors 404. The controllers 408, 410 can be further configured to responsively perform a series of functions intended to control the discharge pressure and/or flow of the two pumps 102 in a desired manner.

As noted above, the first and second pumps 102, 103 in the illustrated system hydraulically interact with each other due to their discharge ports 206 being connected via line 316. In particular, the discharge pressure of the two pumps is always the same. Thus, with a given pump load flow, any change in the position of the swashplate 104 of either the first or the second pump 102, 103, will effect the discharge pressure. A complicated control system including several closed loops results when feedback of the pump discharge pressure and the swashplate positions is provided. A simplified control system can be provided by configuring the controller of one of the pumps with an appropriate pump discharge pressure control law and the controller of the other pump with an appropriate pump displacement control law.

Assuming that the first and second pumps 102, 103 are identical, the pump discharge pressure P and the displacement of the first and second pumps, i.e. their respective swashplate positions $\alpha_1$ and $\alpha_2$, can be expressed in Laplace domain using a singular perturbation method to linearize the system dynamics as:

$$P(s) = \frac{-\frac{\beta}{V}\left(\begin{array}{c} K_D \omega A_c L_c k_{qp}(x_1(s) + x_2(s)) + \\ Q_L(s)((cc_{cl} - (A_c L_c)^2)s + k_\alpha c_{cl}) \end{array}\right)}{(cc_{cl} - (A_c L_c)^2)s^2 + \left(\frac{\beta c_l}{V}(cc_{cl} - (A_c L_c)^2) + k_\alpha c_{cl}\right)s + \frac{\beta c_l}{V}k_\alpha c_{cl} - 2\frac{\beta c_l}{V}K_D \omega a_p} \quad (1)$$

-continued $$\alpha_1(s) \approx \frac{c_{cl} a_p P(s) - A_c L_c k_{qp} x_1(s)}{((cc_{cl} - (A_c L_c)^2)s + k_\alpha c_{cl})} \quad (2)$$

$$\alpha_2(s) \approx \frac{c_{cl} a_p P(s) - A_c L_c k_{qp} x_2(s)}{((cc_{cl} - (A_c L_c)^2)s + k_\alpha c_{cl})} \quad (3)$$

Where $Q_L(s)$ is the load flow rate of the two pumps; the overall control volume of the pump discharge port is V; $c_l$ is a overall leakage coefficient for the two pumps; the leakage coefficient of each of the control servos is $c_{cl}$; the fluid bulk modulus is constant and denoted by β; the pump displacement coefficient is $K_D$; $A_c$ is the control servo actuator area; $L_c$ is the distance from the center of the control servo actuator to the swashplate pivot point; $k_{qp}$ is the control valve flow gain coefficient linearized at a certain operating condition; c is the damping ratio for the swashplate; and $x_1$ and $x_2$ are the respective control valve spool 304 positions for the first and second pumps 102, 103 with zero set at null. Additionally, in Equations (1)-(3) where:

$$k_\alpha = k_{sprg} L_b - \frac{Nr^2 m_p \omega^2}{2} \quad (4)$$

with $k_{sprg}$ being the servo spring rate; r being radius of the pump piston pitch circle; $L_b$ being the distance from the feedback servo center to the swashplate pivot point; N being the number of pistons; and $m_p$ being the mass of piston assembly. Moreover, in Equations (1)-(3) where:

$$a_p = \left(A_b L_b + \frac{rn A_p \gamma}{2\pi}\right) \quad (5)$$

with $A_b$ being the cross-sectional area of the control servo, n being the pump running speed, $A_p$ being the piston cross-sectional area, and γ being the pressure carry over angle.

Figure 5:
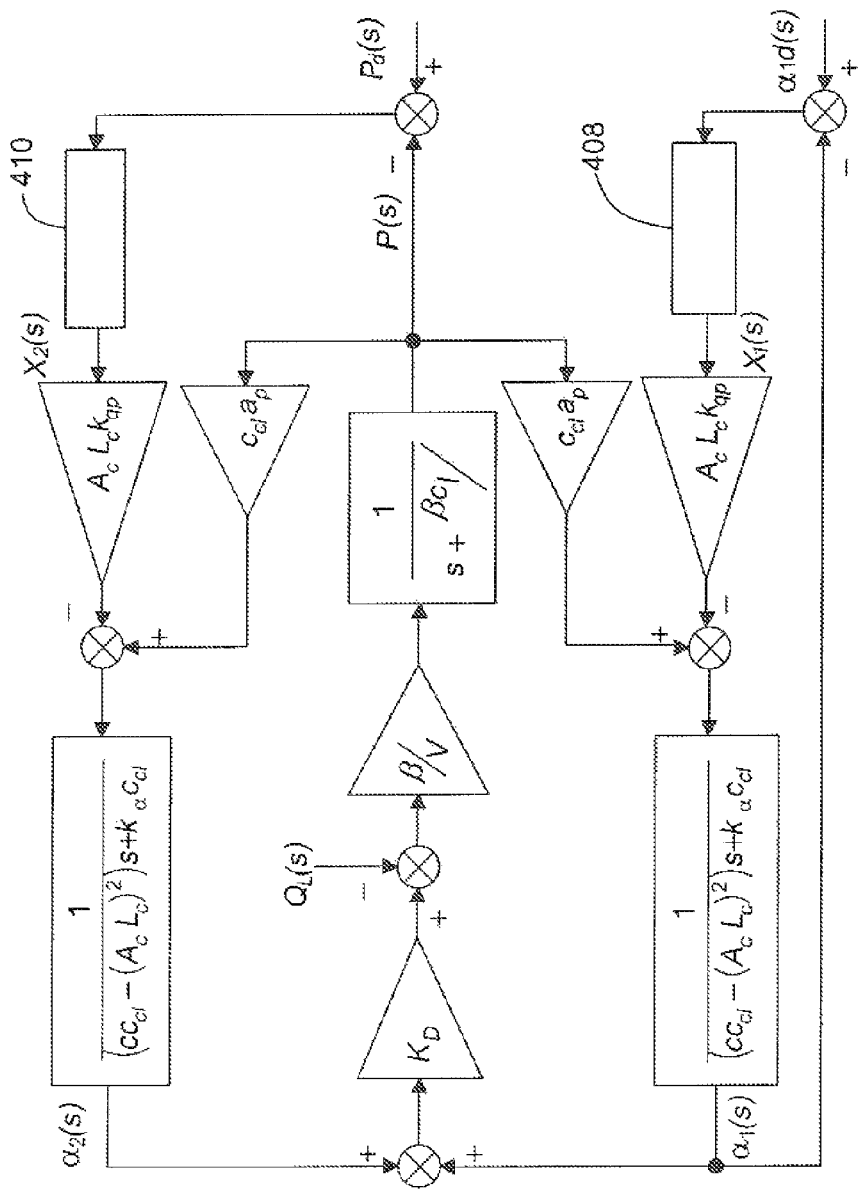
FIG. 5 is a feedback control diagram for the control system of FIG. 4.

In order to control the pump discharge pressure P and the displacement of one of the pumps, e.g. $\alpha_1$, a MIMO (multiple input, multiple output) control design can be used such as shown diagrammatically in FIG. 5. In the system shown in FIG. 5, two system outputs, P and $\alpha_1$, are controlled simultaneously by two control inputs $x_1$ and $x_2$. Ignoring the flow leakage in the control servo 314 to better reveal the physical meanings of the related variables, a transfer matrix of the system, shown in FIG. 5, can be established as follows:

$$\begin{pmatrix} \alpha_1(s) \\ P(s) \end{pmatrix} = \begin{pmatrix} \frac{k_{qp}}{A_c L_c s} & 0 \\ \frac{\beta}{V}\left(\frac{K_D \omega k_{qp}}{A_c L_c}\right) & \frac{\beta}{V}\left(\frac{K_D \omega k_{qp}}{A_c L_c}\right) \\ \left(s + \frac{\beta c_l}{V}\right)s & \left(s + \frac{\beta c_l}{V}\right)s \end{pmatrix} \begin{pmatrix} x_1(s) \\ x_2(s) \end{pmatrix} - \frac{\beta}{V}\begin{pmatrix} 0 \\ Q_L(s) \end{pmatrix} \quad (6)$$

In order to determine if the MIMO control system of FIG. 5 can be decoupled into two SISO (single input, single output) systems, a decoupling technique can be used to yield the following transfer matrix:

$$T = \begin{pmatrix} \dfrac{k_{qp}}{A_c L_c s} & 0 \\ \dfrac{\beta}{V}\left(\dfrac{K_D \omega k_{qp}}{A_c L_c}\right) & \dfrac{\beta}{V}\left(\dfrac{K_D \omega k_{qp}}{A_c L_c}\right) \\ \left(s + \dfrac{\beta c_l}{V}\right)s & \left(s + \dfrac{\beta c_l}{V}\right)s \end{pmatrix} \quad (7)$$

This transfer matrix can be diagonalized by left multiplication of a matrix using:

$$L = \begin{pmatrix} 1 & 0 \\ -1 & 1 \end{pmatrix} \quad (8)$$

as:

$$\begin{pmatrix} \dfrac{k_{qp}}{A_c L_c s} & 0 \\ \dfrac{\beta}{V}\left(\dfrac{K_D \omega k_{qp}}{A_c L_c}\right) & \dfrac{\beta}{V}\left(\dfrac{K_D \omega k_{qp}}{A_c L_c}\right) \\ \left(s + \dfrac{\beta c_l}{V}\right)s & \left(s + \dfrac{\beta c_l}{V}\right)s \end{pmatrix} \begin{pmatrix} 1 & 0 \\ -1 & 1 \end{pmatrix} = \begin{pmatrix} \dfrac{k_{qp}}{A_c L_c s} & 0 \\ 0 & \dfrac{\beta}{V}\left(\dfrac{K_D \omega k_{qp}}{A_c L_c}\right) \\ & \left(s + \dfrac{\beta c_l}{V}\right)s \end{pmatrix} \quad (9)$$

This means the system control design of the two pump system can be performed in a SISO manner in terms of intermediate control variables $$\begin{pmatrix} v_1(s) \\ v_2(s) \end{pmatrix},$$

with a transformation of:

$$\begin{pmatrix} x_1(s) \\ x_2(s) \end{pmatrix} = \begin{pmatrix} 1 & 0 \\ -1 & 1 \end{pmatrix} \begin{pmatrix} v_1(s) \\ v_2(s) \end{pmatrix} \quad (10)$$

Figure 6:
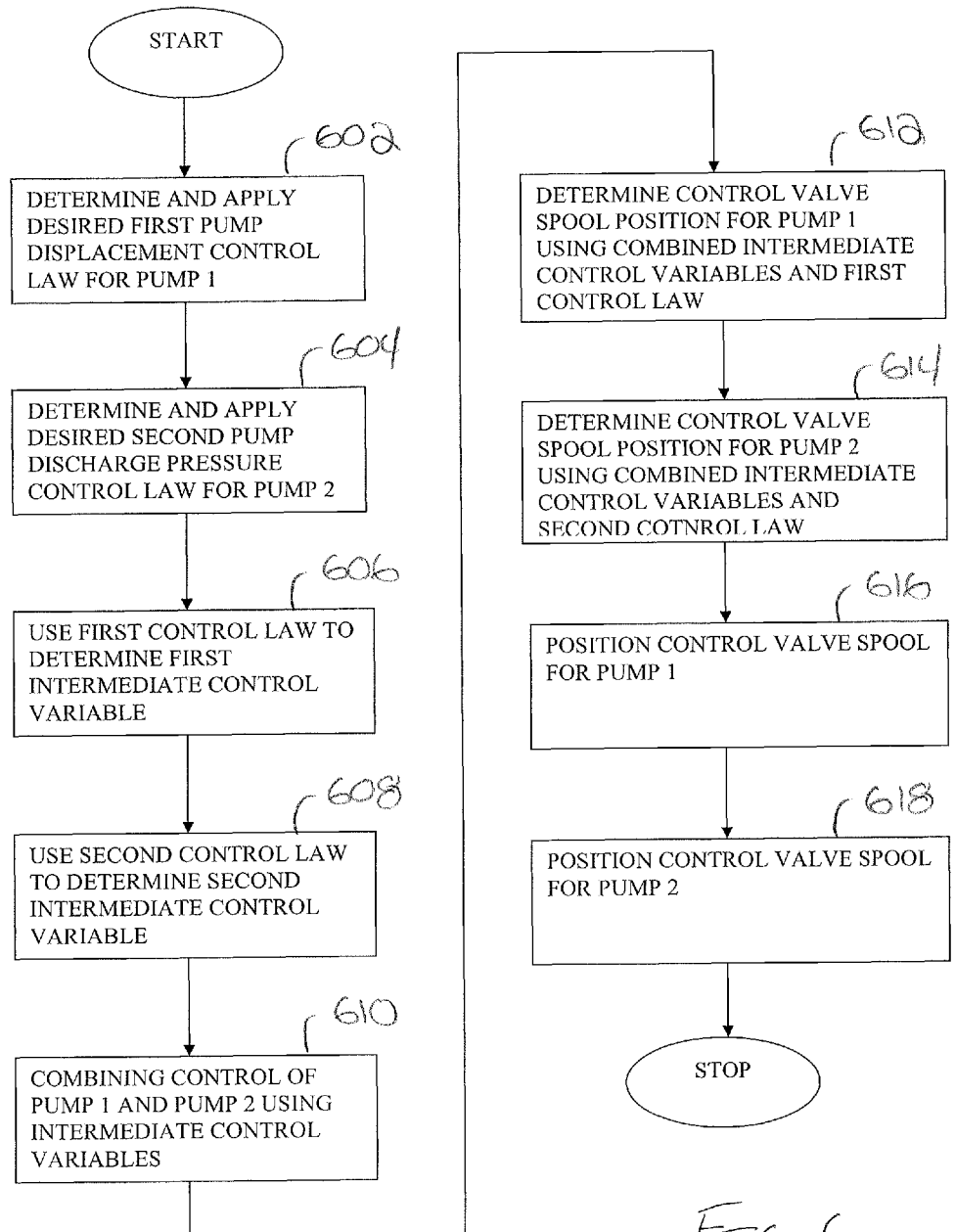
FIG. 6 is a flow diagram illustrating a control method according to the present disclosure.

By decoupling the MIMO control system into SISO ones as shown above, the pump discharge pressure P and the swashplate position $\alpha_1$ can be essentially controlled independently with intermediate variables with the load pressure and load flow treated as the system disturbances. A flow diagram showing a method by which this can be accomplished in an exemplary embodiment involving the two pump configuration of FIGS. 3 and 4 is shown in FIG. 6. In particular, in terms of the illustrated embodiment, a desired first pump displacement control law is determined and applied with respect to the first pump 102 through appropriate configuration of the first controller 408 in block 602. Likewise, a second pump discharge pressure control law is determined and applied with respect to the second pump 103 through appropriate configuration of the second controller 410 in block 604. The first displacement control law and the second discharge pressure control law can be designed separately in blocks 602 and 604. The first pump displacement control law can be used to determine a first intermediate control variable (i.e., $v_1$ of Equation (10)) in block 606 and the second pump discharge pressure control law yields a second intermediate control variable (i.e., $v_2$ of Equation (10)) in block 608. The controls of the two pumps are then combined in block 610 using the first and second intermediate control variables $v_1$, $v_2$. The combination of the first and second intermediate control variables $v_1$, $v_2$ in block 610 can be achieved by applying Equation (10) in the disclosed embodiment. Once combined, the appropriate positions for the valve spools 304 of the respective control valves 302 for the first and second pumps 102, 103 can be determined in blocks 612 and 614. These positions are then applied to the respective spools in blocks 616, 618 so as to produce the desired pump displacement and discharge pressure.

Thus, the control method of FIG. 6 enables the pump discharge pressure to be controlled by the position of the swashplate of one pump while the pump displacement is controlled by the position of the swashplate of the other pump. Since the intermediate control variables are decoupled, any suitable displacement control law and pressure control law can be used without jeopardizing system stability. According to one embodiment, the control laws can be linearized representations of system dynamics. With respect to a two pump system of FIGS. 3 and 4, the transformation of Equation (10) can be understood in that the swashplate position $\alpha_1$ of the first pump 102 can be controlled as if it were in a single pump system with the pump discharge pressure treated as the disturbance. However, the pump discharge pressure will be affected by any movement of $\alpha_1$ so that the part the system handling the control of the discharge pressure will compensate for this effect upon the combination of the two controls using the two intermediate control variables by subtracting the same amount of the control effort from the otherwise independently designed pressure control law. While the illustrated embodiment includes two controllers 408, 410, it will be understood that a single controller could also be used that is configured to separately direct operation of the first and second pumps 102, 103 using the first and second control laws.

The control method illustrated in FIG. 6 allows the pump displacement and the pump discharge pressure to be optimized for different control performance requirements. For example, the displacement control law for determining the desired swashplate position $\alpha_1$ of the first pump 102 could be taken as the following:

$$\alpha_{1d}(s) = \alpha_2(s) + \Delta\alpha_d \quad (11)$$

With such a displacement control law, the desired swashplate position $\alpha_1$ of the first pump 102 is equal to the swashplate position $\alpha_2$ of the second pump 103 plus a fixed swashplate position difference, $\Delta\alpha_d$. If the fixed swashplate position difference $\Delta\alpha_d$ is set to zero, then the control becomes, as a practical matter, pressure control with the displacement control law set as a displacement constraint of equal pump displacement.

While the disclosed control method and apparatus is described in connection with a two pump system for delivering pressurized hydraulic fluid, it is equally applicable to systems involving more than two pumps. For example, in a three pump system, a first pair of pumps is selected. Then, for that pair of pumps, one is controlled using a displacement control law and the other is controlled using a discharge pressure control law such as shown in FIG. 6. After the resulting intermediate control variables are combined, that result is then treated as a single pump that is then considered together with the third pump with the method of FIG. 6 being applied to the combined first and second pumps as a single pump and the third pump. Larger numbers of pumps can be handled in a similar manner. For example, the disclosed control method and apparatus could then be applied to a four pump system, by taking the three pump result from the three pump example as a single pump that is then combined with the fourth pump.

INDUSTRIAL APPLICABILITY

The control method and apparatus described herein allows hydraulic systems to utilize a combination of multiple pumps having different configurations (for example, pumps of different sizes) without adding control complexity and the added cost associated therewith. Moreover, the disclosed control method and apparatus enables a multiple pump system to be readily configured to optimize pump efficiency. In particular, controlling the pressure and displacement separately, provides a robust control system that is insensitive to system uncertainties by controlling the pressure and displacement respectively.

The disclosed control method and apparatus can be readily implemented in any hydraulic system involving two or more variable displacement hydraulic pumps. For example, variable displacement hydraulic pumps are often used to provide a supply of pressurized hydraulic fluid to various actuators for performing work functions. For example, work implements on earth-moving machines are typically powered by hydraulically actuated cylinders.

It will be appreciated that the foregoing description provides examples of the disclosed system and method. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A hydraulic system for providing hydraulic power to a load comprising:
   a first variable displacement hydraulic pump including a first swashplate pivotably supported with respect to the first pump and a first control valve for controlling an angle of inclination of the first swashplate, the first pump having a first discharge port out of which pressurized hydraulic fluid is discharged from the first pump and an associated discharge pressure;
   a second variable displacement hydraulic pump including a second swashplate pivotably supported with respect to the second pump and a second control valve for controlling an angle of inclination of the second swashplate, the second pump having a second discharge port out of which pressurized hydraulic fluid is discharged from the second pump and an associated discharge pressure, wherein the first and second discharge ports are connected such that the first and second pump have the same discharge pressure; and
   at least one controller in communication with the first and second control valves, the controller being configured with a first desired pump displacement control law for the first pump under which the first control valve is controlled as a function of pump displacement and a second desired pump discharge pressure control law for the second pump under which the second control valve is controlled as a function of the discharge pressure of the first and second pumps and being configured to use the first control law to determine a first intermediate control variable and to use the second control law to determine a second intermediate control variable; the controller combining the control of the first and second pumps using the first and second intermediate control variables and determining a desired control valve setting for the control valve of the first pump using the combined first and second intermediate control variables and the first control law and determining a desired control valve setting for the control valve of the second pump using the combined first and second intermediate control variables and the second control law.

2. The system of claim 1 further a sensor arranged and configured to sense the discharge pressure of the first and second pumps.

3. The system of claim 1 further including a sensor arranged and configured to sense the angle of inclination of the swashplate of the first pump.

4. The system of claim 1 wherein the controller is configured to position the control valve of the first pump at the desired first control valve setting.

5. The system of claim 1 wherein the controller is configured to position the control valve of the second pump at the desired second control valve setting.

6. The system of claim 1 wherein the first control law comprises displacement constraint of the first and second pumps.

7. The system of claim 1 further including a third variable displacement hydraulic pump.

8. The system of claim 1 further wherein the first and second pumps are configured differently.

9. A method for controlling discharge pressure and pump displacement of a plurality of variable displacement hydraulic pumps each having a discharge port and an associated discharge pressure, the discharge ports of the pumps being connected together such that the pumps have the same discharge pressure, each pump including a swashplate and a control valve for controlling an angle of inclination of the swashplate, comprising the steps of:
   determining a desired first pump displacement control law for a first pump under which the control valve for the first pump is controlled as a function of pump displacement;
   determining a desired second pump discharge pressure control law for a second pump under which the control valve for the second pump is controlled as a function of the discharge pressure of the plurality of pumps;
   using the first control law to determine a first intermediate control variable;
   using the second control law to determine a second intermediate control variable;
   combining the control of the first and second pumps using the first and second intermediate control variables;
   determining a desired first control valve setting for the control valve of the first pump using the combined first and second intermediate control variables and the first control law; and
   determining a desired second control valve setting for the control valve of the second pump using the combined first and second intermediate control variables and the second control law.

10. The method of claim 9 further including the step of sensing the discharge pressure of the first and second pumps.

11. The method of claim 9 further including the step of sensing the angle of inclination of the swashplate of the first pump.

12. The method of claim 9 further including the step of positioning the control valve of the first pump at the desired first control valve setting.

13. The method of claim 9 further including the step of positioning the control valve of the second pump at the desired second control valve setting.

14. The method of claim 9 wherein the first control law comprises displacement constraint of the first and second pumps.

15. An apparatus for controlling discharge pressure and pump displacement of a plurality of variable displacement hydraulic pumps each having a discharge port and an associated discharge pressure, the discharge ports of the pumps being connected together such that the pumps have the same discharge pressure comprising:
- a first swashplate pivotably supported with respect to a first pump;
- a second swashplate pivotably supported with respect to a second pump;
- a first control valve for controlling an angle of inclination of the first swashplate;
- a second control valve for controlling an angle of inclination of the second swashplate; and
- at least one controller in communication with the first and second control valves, the controller being configured with a desired first pump displacement control law for the first pump under which the first control valve is controlled as a function of pump displacement and a desired second pump discharge pressure control law for a second pump under which the second control valve is controlled as a function of the discharge pressure of the plurality of pumps and being configured to use the first control law to determine a first intermediate control variable and to use the second control law to determine a second intermediate control variable; the controller combining the control of the first and second pumps using the first and second intermediate control variables and determining a desired first control valve setting for the control valve of the first pump using the combined first and second intermediate control variables and the first control law and determining a desired second control valve setting for the control valve of the second pump using the combined first and second intermediate control variables and the second control law.

16. The apparatus of claim 15 further including a sensor arranged and configured to sense the discharge pressure of the first and second pumps.

17. The apparatus of claim 15 further including a sensor arranged and configured to sense the angle of inclination of the swashplate of the first pump.

18. The apparatus of claim 15 wherein the controller is configured to position the control valve of the first pump at the desired first control valve setting.

19. The apparatus of claim 15 wherein the controller is configured to position the control valve of the second pump at the desired second control valve setting.

20. The apparatus of claim 15 wherein the first control law comprises displacement constraint of the first and second pumps.

* * * * *